United States Patent
Inoue

(10) Patent No.: US 8,826,311 B2
(45) Date of Patent: Sep. 2, 2014

(54) INFORMATION RECORDING MEDIUM AND HOLDING DEVICE FOR HOLDING INFORMATION RECORDING MEDIUM

(75) Inventor: Kazuo Inoue, Osaka (JP)

(73) Assignee: Panasonic Corporation, Osaka (JP)

(*) Notice: Subject to any disclaimer, the term of this patent is extended or adjusted under 35 U.S.C. 154(b) by 0 days.

(21) Appl. No.: 13/817,664

(22) PCT Filed: May 2, 2012

(86) PCT No.: PCT/JP2012/002974
§ 371 (c)(1),
(2), (4) Date: Feb. 19, 2013

(87) PCT Pub. No.: WO2012/153503
PCT Pub. Date: Nov. 15, 2012

(65) Prior Publication Data
US 2013/0247075 A1    Sep. 19, 2013

(30) Foreign Application Priority Data

May 10, 2011  (JP) ................................ 2011-105070

(51) Int. Cl.
- G11B 7/24 (2013.01)
- G11B 7/24035 (2013.01)
- G11B 7/26 (2006.01)
- G11B 7/24047 (2013.01)

(52) U.S. Cl.
CPC ............ *G11B 7/24035* (2013.01); *G11B 7/263* (2013.01); *G11B 7/266* (2013.01); *G11B 7/24047* (2013.01)
USPC ........................................ 720/724; 369/382

(58) Field of Classification Search
USPC .................. 369/280–282; 720/645, 718–724; 360/99.04, 99.05
See application file for complete search history.

(56) References Cited

U.S. PATENT DOCUMENTS

| 4,435,343 A | 3/1984 | Ando et al. |
| 2002/0142128 A1 | 10/2002 | Kawaguchi et al. |

(Continued)

FOREIGN PATENT DOCUMENTS

| JP | 62-050897 B | 10/1987 |
| JP | 04-054302 B | 8/1992 |

(Continued)

OTHER PUBLICATIONS

English translation of JP 2008090932 A.*

(Continued)

*Primary Examiner* — Nathan Danielsen
(74) *Attorney, Agent, or Firm* — Renner, Otto, Boisselle & Sklar, LLP

(57) ABSTRACT

An information recording medium 100 according to one aspect of the present invention includes a disc substrate 1 formed by a resin, and a thickness thereof in a data area 102 is 0.2 mm or less. The information recording medium 100 includes a step 110 in an inner periphery area 101, the step having a height of 1 mm or more and 3 mm or less. The step 110 includes an acute-angle edge portion 111 used for positioning a center of the information recording medium 100 when spinning the information recording medium 100; and an angle θ of an inner side of a cross section of the acute-angle edge portion 111 is 50 degrees or more and 80 degrees or less.

6 Claims, 14 Drawing Sheets

(56) References Cited

U.S. PATENT DOCUMENTS

| | | | |
|---|---|---|---|
| 2002/0181387 A1 | 12/2002 | Kim et al. | |
| 2004/0047280 A1* | 3/2004 | Lee et al. | 369/282 |
| 2004/0101650 A1 | 5/2004 | Kawaguchi et al. | |
| 2005/0034617 A1 | 2/2005 | Kawaguchi et al. | |
| 2005/0044559 A1* | 2/2005 | Kanehira et al. | 720/721 |
| 2005/0213484 A1* | 9/2005 | Hasegawa et al. | 369/282 |
| 2008/0016523 A1* | 1/2008 | Hayashi et al. | 720/718 |

FOREIGN PATENT DOCUMENTS

| | | |
|---|---|---|
| JP | 09-153231 A | 6/1997 |
| JP | 2002-298450 A | 10/2002 |
| JP | 2003-006936 A | 1/2003 |
| JP | 2006-134436 A | 5/2006 |
| JP | 2008-090932 A | 4/2008 |

OTHER PUBLICATIONS

International Search Report for corresponding International Application No. PCT/JP2012/002974 mailed Aug. 14, 2012.

International Preliminary Report on Patentability for corresponding International Application No. PCT/JP2012/002974 dated Dec. 25, 2012.

"Optical memory and its systems for next generation", supervised by Yoshihiro Okino, CMC Publishing Co., Ltd., Jan. 2009 (p. 79-89) and concise English explanation (cited in [0003] of the specification).

* cited by examiner (a)

(b)

(a)

(b)

(a)

(b)

(a)

(b)

(a)

(b)

(a)

(b)

(c)

INFORMATION RECORDING MEDIUM AND HOLDING DEVICE FOR HOLDING INFORMATION RECORDING MEDIUM

TECHNICAL FIELD

The present application relates to an information recording medium made of a resin whose thickness is less than 0.2 mm, and a holder for holding the information recording medium.

BACKGROUND ART

In order to record/erase/reproduce information, at a high speed, to/from a disc-shaped optical recording medium whose substrate is made of a resin, it is necessary to spin the optical recording medium at a high speed.

However, when a disc made of a resin such as polycarbonate or polyolefin whose thickness is about 1.2 mm, e.g., a CD (compact disc), a DVD (digital versatile disc), a BD (blu-ray disc), or the like, is spun at a speed of 10000 rpm or more, the surface deflection may increase due to the insufficient strength, thereby breaking the disc. One may consider using a metal, a glass or a ceramic having a higher rigidity than a resin, but it will result in a high cost. In view of this, a disc whose thickness is about 0.1 mm has been proposed as a method of using a resin (e.g., Non-Patent Document No. 1).

Such a thin disc also has an inner hole and an outer shape that are concentric and circular, as those of a conventional disc, and the inner hole is fit around a center cone on the disc-clamping side, thereby centering the disc. For the inner diameter/outer diameter machining of a disc, the Thomson method is often used, in which the disc is cut with a thin blade such as a razor.

Patent Document No. 1 describes a method in which the inner diameter/outer diameter machining of a disc is done with laser. In the cut-out process using laser, an array of pits provided on the substrate are detected to determine the center point in the array of pits, thereby positioning the inner diameter and the outer diameter at predetermined distances from the center point.

While positioning is done in Patent Document No. 1 based on an array of pits on the substrate, Patent Document No. 2 discloses providing a mark for positioning.

Patent Document No. 3 describes a method in which in order to eliminate the play with a disc supporting portion of a recording/reproducing apparatus which occurs because the thickness of the disc is small, a slope is provided toward an end portion of the inner hole of the disc to match the slope of the disc supporting portion.

CITATION LIST

Patent Literature

Patent Document No. 1: Japanese Patent Publication for Opposition No. 4-054302
Patent Document No. 2: Japanese Patent Publication for Opposition No. 62-050897
Patent Document No. 3: Japanese Laid-Open Patent Publication No. 2008-090932

Non-Patent Literature

Non-Patent Document No. 1: "Optical memory and its systems for next generation", supervised by Yoshihiro Okino, CMC Publishing Co., Ltd., January 2009 (P. 79-89)

SUMMARY OF INVENTION

Technical Problem

For such optical discs having small thicknesses as described above, it is required that the inner hole is made unlikely to break and that the deflection is made small. A non-limiting example embodiment of the present application provides an information recording medium of which the inner hole is unlikely to break and the deflection can be made small, and a holder for holding the information recording medium.

Solution to Problem

An information recording medium according to one aspect of the present invention is an information recording medium, including a disc substrate formed by a resin, whose thickness in a data area thereof is 0.2 mm or less, further including: a step in an inner periphery area of the information recording medium, the step having a height of 1 mm or more and 3 mm or less, wherein: the step includes an acute-angle edge portion used for positioning a center of the information recording medium when spinning the information recording medium; and an angle of an inner side of a cross section of the acute-angle edge portion is 50 degrees or more and 80 degrees or less.

Advantageous Effects of Invention

In an information recording medium according to one aspect of the present invention, a step provided in an inner periphery area of the information recording medium is used for positioning the center of the information recording medium. Thus, it is possible to reduce the deflection between the center of the data area of the information recording medium and the center of rotation.

DESCRIPTION OF EMBODIMENTS

Figure 1:
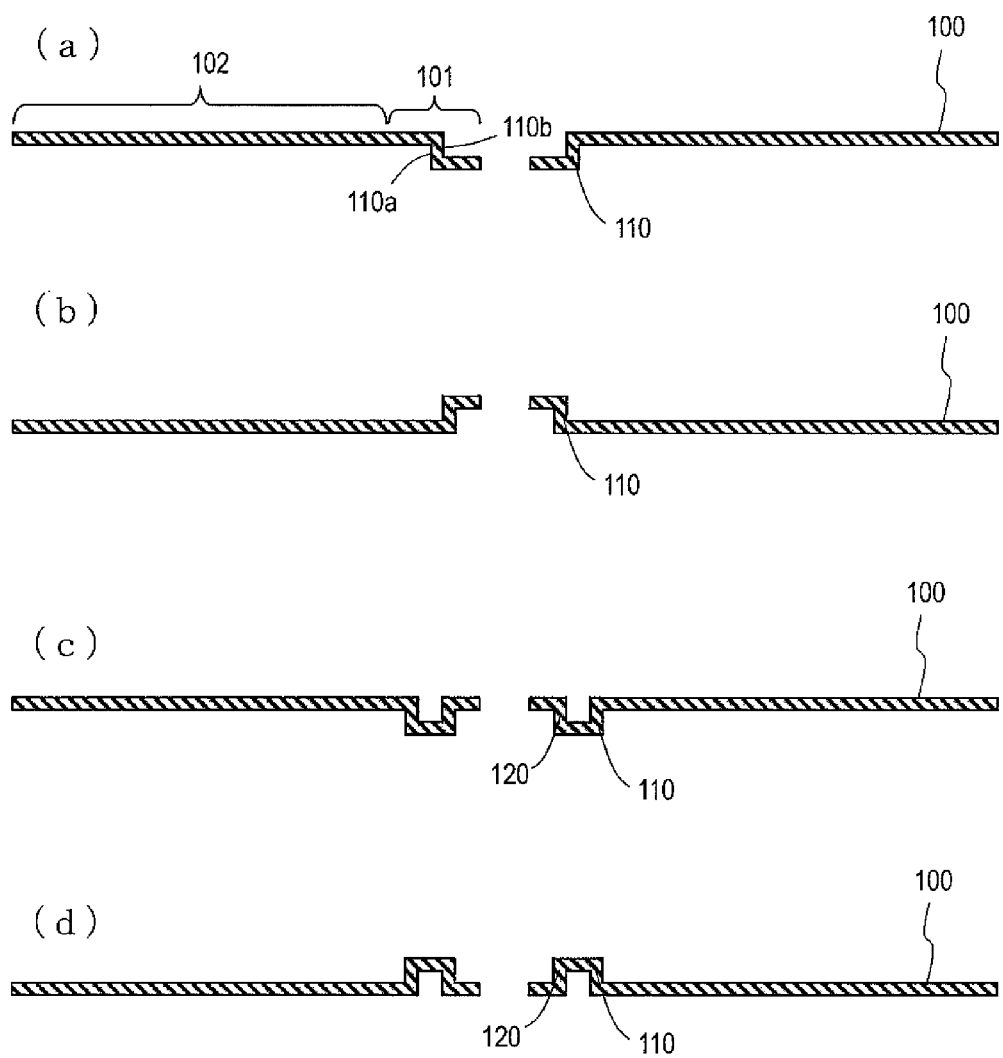
FIG. 1 (*a*), (*b*), (*c*) and (*d*) are cross-sectional views of an information recording medium according to an example embodiment.

A finding, based on which the present invention has been made, is as follows.

Such a thin disc whose thickness is 0.1 mm as described above does not have sufficient rigidity, and has a problem that the roundness of the inner hole of the disc deteriorates during the machining.

With the Thomson method, in which the inner hole of a disc is cut with a thin blade, there are variations between discs to be machined because the blade is likely to deform due to the lack of strength. Variations of the inner diameter will be about ±50 µm with respect to the target. With punching, the resin will be clamped and pulled, and therefore the cut surface will be jagged. When it is clamped a portion at a time while gradually shifting the portion to be clamped, instead of clamping it all at once, the cut surface will be clean, but a portion that is cut earlier will be pulled for a longer time than another portion that is cut later, failing to obtain a true circle.

When machining with laser, a resin is melted with heat and cut across the circumference, and it is difficult to obtain a true circle in a portion where the process completes the circumference with some overlap.

If the roundness is poor as described above, the amount of shift between the center about which the disc is spun and the center of the data area on the disc, i.e., the deflection, increases; therefore, even if the disc can be spun at 10000 rpm or more, the pickup will not be able to follow the track provided in the circumferential direction in the data area of the disc, failing to record/reproduce.

Moreover, repeated attachment/detachment between the inner hole of the disc and the center cone of the disc holding portion of the recording/reproducing apparatus may lead to a fatigue breakdown due to the thinness of the disc, resulting in a deterioration of the roundness.

In one aspect of the present invention, there is provided an information recording medium of which the inner hole is unlikely to break and the deflection can be made small, and a holder for holding the information recording medium.

The outline of one aspect of the present invention is as follows.

An information recording medium according to one aspect of the present invention is an information recording medium, including a disc substrate formed by a resin, whose thickness in a data area thereof is 0.2 mm or less, further including: a step in an inner periphery area of the information recording medium, the step having a height of 1 mm or more and 3 mm or less, wherein: the step includes an acute-angle edge portion used for positioning a center of the information recording medium when spinning the information recording medium; and an angle of an inner side of a cross section of the acute-angle edge portion is 50 degrees or more and 80 degrees or less.

The information recording medium includes a plurality of steps; and at least one of the plurality of steps includes the acute-angle edge portion.

A holder according to one aspect of the present invention is a holder for holding the information recording medium, including: a holding portion for holding the information recording medium; and a positioning section for positioning a center of the information recording medium, wherein the positioning section positions the center of the information recording medium by contacting the acute-angle edge portion of the step.

The positioning section is movable along an axis-of-rotation direction of the information recording medium, for example; the positioning section includes a tapered portion inclined with respect to the axis-of-rotation direction; and positioning of the center of the information recording medium is done by pressing the acute-angle edge portion of the step and the tapered portion against each other.

An information recording medium according to one aspect of the present invention is an information recording medium, including a disc substrate formed by a resin, whose thickness in a data area thereof is 0.2 mm or less, further including: a step in an inner periphery area of the information recording medium, the step having a height of 1 mm or more and 3 mm or less, wherein: a side surface of the step is used for positioning a center of the information recording medium when spinning the information recording medium; and an angle between a plane direction of the data area and a side surface direction of a cross section of the step is 80 degrees or more and 100 degrees or less.

An information recording medium according to one aspect of the present invention is made of a thermoplastic resin having a thickness of 0.2 mm or less, and an annular step that is concentric with the center of the data area and that has a height of 1 mm or more and 3 mm or less is provided in the clamp area or on the inner side of the clamp area. Then, a positioning mechanism to be in contact with the step provided on the information recording medium is provided in the disc holding portion of the recording/reproducing apparatus so that the center of the rotating portion of the recording/reproducing apparatus can be aligned with the center of the data of the disc.

With a method for holding an information recording medium according to one aspect of the present invention, an annular step that is concentric with the center of the data area and that has a height of 1 mm or more and 3 mm or less is formed in the clamp area or on the inner side of the clamp area on an information recording medium whose thickness is 0.2 mm or less; an annular member that includes at least a side surface and a tapered surface concentric with the center of rotation and moves in the axial direction is provided in the disc holding portion of the recording/reproducing apparatus, wherein the annular member and the step on the information recording medium are brought into contact with each other either directly or via a further annular member that includes a side surface and a tapered surface concentric with the center of rotation and is divided in the circumferential direction into pieces that move in the radial direction, thus providing a mechanism for aligning the center of the data area on the information recording medium and the center of rotation of the disc holding portion with each other.

A first method for manufacturing an information recording medium according to one aspect of the present invention is directed to a case where depressions/protrusions have already been formed on the data area of a sheet-like resin substrate having a thickness of 0.2 mm or less when the resin substrate is machined to provide an inner diameter and an outer diameter and then attached into the mold, wherein the center of the data area is determined from the depressions/protrusions, and the sheet-like substrate is attached and heat-pressed at a position that is aligned with the center of the step in the mold.

A second method for manufacturing an information recording medium according to one aspect of the present invention is directed to a case where depressions/protrusions have not been formed on the data area of a sheet-like resin substrate having a thickness of 0.2 mm or less when the resin substrate is machined to provide an inner diameter and an outer diameter and then attached into the mold, wherein after a stamper for forming the depressions/protrusions is attached at a position such that the center of the data area on the stamper is aligned with the center of the step in the mold, the sheet-like substrate is attached to the mold based on the inner hole and the outer diameter and the heat-pressed, thereby forming the step and the data area together on the information recording medium.

With a third method for manufacturing an information recording medium according to one aspect of the present invention, after the step is formed on the information recording medium by the first or second manufacturing method described above, the mold is opened slightly and compressed air is introduced through the gap, thereby making acute the angle of the edge of the step on the information recording medium to be in contact with the positioning member of the disc holding side.

According to one aspect of the present invention, since positioning for holding the disc is done with a step of an information recording medium having desirable roundness, rather than with an inner hole of an information recording medium having poor roundness, it is possible to keep small the deflection between the center of the data area of the disc and the center of rotation.

Moreover, even if a thin information recording medium is placed on a flat surface, the inner side of the information recording medium will not be in direct contact with the surface, whereby it is unlikely to be scratched, and such media are easily separated from one another.

Furthermore, where the edge of the step is made with an acute angle, even if discs are stacked together with something passing through the inner holes, the discs are separate from one another by the step portions, and therefore such discs can be stacked together into a skewer-like stack without a spacer, thus improving the productivity.

Embodiments of the present invention will now be described with reference to the drawings. Although the description of the embodiments of the present invention illustrates an optical disc as an example of the information recording medium, the information recording medium is not limited to an optical disc, but may be any information recording medium that is spun when recording and/or reproducing. For example, the information recording medium may be a magnetic disc, a magneto-optical disc, a bit-patterned medium, a hologram disc, a near-field optical disc, a disc utilizing plasmon, and the like.

(Embodiment 1)

FIGS. 1(a) to 1(d) are cross-sectional views of an optical disc 100 according to Embodiment 1 of the present invention.

In an inner periphery area 101 of the optical disc 100 (in the clamp area or on the inner side of the clamp area), an annular step 110 that is concentric with the center of a data area 102 is formed. Side surfaces 110a and 110b of the step 110 are formed in a generally vertical direction with respect to the plane of the data area 102. FIGS. 1(a) and 1(b) show the optical disc 100 in which the number of steps is one, where the portion is depressed or protruding with respect to the data area 102, and FIGS. 1(c) and 1(d) show cases in which the number of steps is two (steps 110 and 120), where the portion is first depressed and turning back up or is first protruding and turning back down with respect to the data area 102. When there are two steps, the strength is increased as compared with a case where there is one step.

Figure 22:
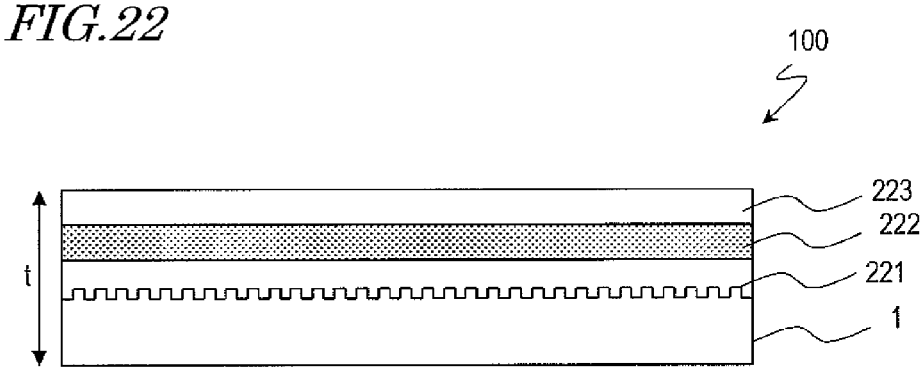
FIG. 22 A partial cross-sectional view of an information recording medium according to an example embodiment.

FIG. 22 is a cross-sectional view schematically showing the optical disc 100. The optical disc 100 includes a disc substrate 1 made of a resin. A groove shape having a land and a groove therein is formed on the disc substrate 1, and a recording layer 221, a reflection layer 222 and a protection layer 223 are formed thereon in this order. Note that the configuration shown in FIG. 22 is an example, and the optical disc is not limited to this. For example, it may be an optical disc having a 4-layer structure including a transparent layer, a recording layer, a transparent layer and a reflection layer from the light-entering side, or may be an optical disc including no reflection layer. Alternatively, it may be an optical disc including depressed or protruding pits formed thereon, instead of a groove shape.

The thickness t of the data area 102 of the optical disc 100 is 0.2 mm or less, for example. Where the optical disc 100 does not have enough rigidity, a circular plate is positioned in the vicinity of the optical disc 100 and a flow of air is provided between the optical disc 100 and the plate flowing from the inner periphery toward the outer periphery, whereby the optical disc 100 is held as if it were attached to the plate while keeping a constant distance therebetween even if the optical disc 100 is spun at 10000 rpm or faster; however, if the thickness of the optical disc 100 increases, the rigidity increases and it will no longer conform to the surface of the circular plate. If the optical disc 100 is too thin, the warping of the disc alone will be significant, and it will likely be creased. Therefore, the thickness of the optical disc 100 is 50 μm or more, for example.

The angle of the side surface direction of the cross section of the step 110 with respect to the plane direction of the data area 102 is, for example, 80 degrees or more and 100 degrees or less, and may be 85 degrees or more and 95 degrees or less.

This is so that the front-to-front contact between the side surface of the step 110 and the abutting member prevents sideslip, or the like, and it is possible to make use of the small degree of roundness of the step 110 for the rotation system of the recording/reproducing apparatus.

The height h (FIG. 23) of the step 110 on the optical disc 100 is 1 mm or more and 3 mm or less, for example. In order not to stress the edge of the step of the optical disc 100, it needs to be rounded, and the radius of curvature needs to be at least as much as the optical disc 100. The rounding of the edge of the member to engage with the step 110 of the optical disc 100 and the rounding of the step 110 of the optical disc 100 need to be such that the radius of curvature on the inner periphery side is larger so that they do not interfere with each other. Where the thickness of the optical disc 100 is 0.2 mm, the radius of curvature on the inner side of the step 110 of the optical disc 100 is 0.2 mm, and it engages with a member whose radius of curvature on the inner side is 0.1 mm larger than the step 110 of the optical disc 100, the height of the step 110 of the optical disc 100 needs to have a value greater than 0.7 mm, and is preferably 1.0 mm or more, in order to form a straight portion, rather than a curved portion, at the step 110 of the optical disc 100. This is because if the height of the step 110 of the optical disc 100 is too low, the grip provided by the step 110 will be insufficient. If the step 110 is too high, the thickness of the side surface of the step will be thin, resulting in an insufficient strength. The thickness of the side surface of the step 110 needs to be 40 µm to 50 µm, and it was not possible to ensure a thickness of 40 µm for the side surface of the step 110 when the step of the optical disc 100 exceeded 3 mm. Thus, the height of the step 110 is preferably 3 mm or less, e.g., 2 mm or less. The material of the optical disc 100 is preferably a polycarbonate resin or a polyolefin resin, which is a thermoplastic resin having a desirable anti-shock property and a desirable thermal machinability. However, the resin may be a different resin such as polypropylene.

(Embodiment 2)

Next, a method for manufacturing the optical disc 100 according to Embodiment 2 of the present invention will be described.

The disc substrate 1 is a resin substrate provided with an inner diameter and an outer diameter. The outer diameter is 120 mm, and the inner diameter is 5 mm. Assume that the thickness of the disc substrate 1 is 0.1 mm. The resin is a polycarbonate resin.

First, how the optical disc 100 of FIG. 1(a) is manufactured will be described using FIGS. 2(a) and 2(b), where depressions/protrusions, e.g., signals to be information and tracks, have not been formed in the data area of the disc substrate 1. FIG. 2(a) is a cross-sectional view showing a state where the mold is open, and FIG. 2(b) is a cross-sectional view showing a state where the mold is closed.

In FIG. 2(a), the disc substrate 1 is still in a flat state. The disc substrate 1 is in contact with a mirror plate 2. A depressed portion 2a is provided on the inner periphery of the mirror plate 2 for forming a step in the disc substrate 1.

On the opposite side to the disc substrate 1, a stamper 3 is attached to a mirror plate 4 with an inner-periphery stamper holder 5 and an outer-periphery stamper holder 6. Signals to be information, tracks, or the like, to be transferred onto the data area of the disc substrate 1 are formed as depressions/protrusions on the stamper 3.

Here, the stamper 3 is made of a metal such as nickel, and machined to provide the inner diameter and the outer diameter through punching, or the like. Since the stamper 3 is a metal whose hardness is higher than a resin, there is obtained a product where the roundness of the inner hole is 10 µm or less.

Although the attachment of the inner-periphery stamper holder 5 to the mirror plate 4 is not shown in FIG. 2(a), it may be done by any of screws, cams and suction. The attachment of the outer-periphery stamper holder 6 to the mirror plate 4 may be done by screws.

A bush 7 is provided every 90 deg outside the mirror plate 2, and a guide post is provided by fitting with a pole 9 outside the mirror plate 4 via the bush 7 and a ball bearing 8, thereby achieving the positioning in the radial direction.

The mirror plate 2 and the mirror plate 4 are configured so that they can be heated by a flow of a medium thereinto from a temperature adjuster or by using a heater, or the like, and the heating is done to a temperature greater than or equal to a glass temperature, thereby allowing the resin of the disc substrate 1 to soften for plastic deformation.

As for the operation, the disc substrate 1 is attached to the mirror plate 2, the stamper 3 is attached to the mirror plate 4, and the air inside the cavity 10 is evacuated via a suction passage 11 that communicates with a cavity 10 formed in the mold. Then, when the mirror plate 2 and the mirror plate 4 are temperature-controlled to the setting temperature, the bush 7 and the pole 9 are fitted together via the ball bearing 8, thus closing the cavity 10; the disc substrate 1 and the stamper 3 are heat-pressed together so as to transfer the depressions/protrusions on the stamper 3 onto the disc substrate 1, and the stamper holder 5 is pushed into a depression 2a at the center of the mirror plate 2 on the inner side of the disc substrate 1, thereby forming a step in the disc substrate 1.

Where grooves having a track pitch of 0.32 µm and a depth of 20 nm are formed, a press was done at 4 tons for 10 seconds, and the transfer was done with the temperature of the mirror plate 2 and the mirror plate 4 being 180° C.

The deflection between the center of the data area of the disc substrate 1 and the center of the step formed on the inner side of the disc substrate 1 was successively kept 10 µm or less.

When releasing the disc substrate 1 from this mold, the mirror plate 2 and the mirror plate 4 are opened slightly in such a range that the protruding portion at the tip of the inner-periphery stamper holder 5 does not come off the inner hole of the disc substrate 1, and compressed air is supplied through the suction passage 11, thereby making it easier to release the mirror plate 2 and the disc substrate 1 from each other.

Figure 3:
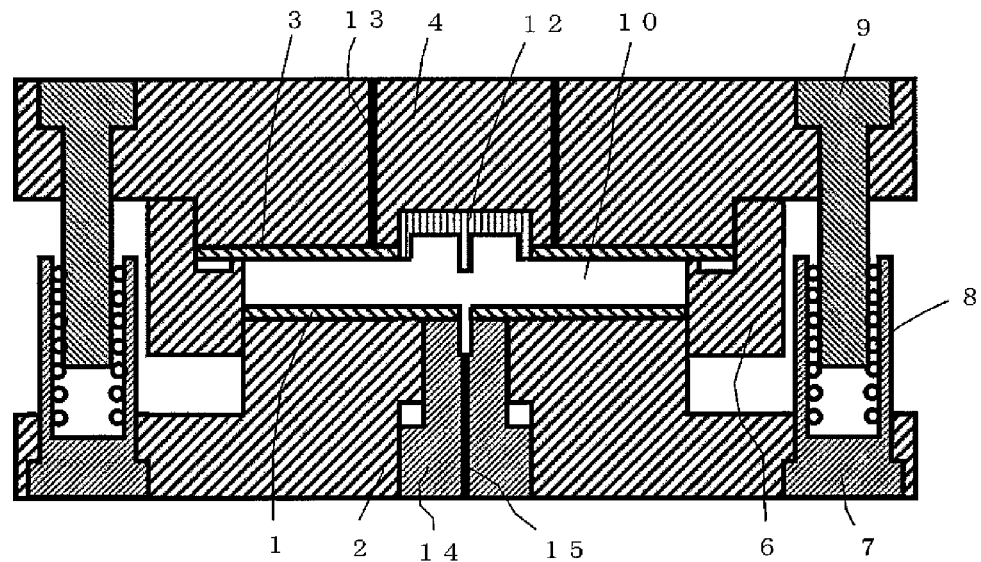
FIG. 3 A cross-sectional view showing a method for manufacturing an information recording medium according to an example embodiment.

When producing the optical disc 100 of FIG. 1(b), a mold shown in FIG. 3 is used. An inner-periphery stamper positioner 12 is provided at the inner periphery of the stamper 3, defining the position at which the stamper 3 is attached to the mold.

A suction groove 13 is provided in a circumferential pattern along the inner periphery of the mirror plate 4, thereby evacuating through the suction groove 13 and securing the stamper 3 onto the mirror plate 4.

A punch 14 is provided on the inner side of the mirror plate 2 and is configured so as to protrude into the depression of the inner-periphery stamper positioner 12 in a state where the mold is closed. Now, the bush 7 and the pole 9 are fitted together via the ball bearing 8 to close the mold, forming the cavity 10, and the air in the cavity 10 is sucked out through a suction passage 15 provided at the center of the punch 14. Then, the mold is further closed to narrow the cavity 10, allowing the disc substrate 1 and the stamper 3 to come into contact with each other, and the mirror plate 2 and the mirror plate 4 are heated and then pressed, thereby heat-pressing the stamper 3 onto the disc substrate 1, transferring the depressions/protrusions on the stamper 3 onto the disc substrate 1, while protruding the punch 14 toward the inner-periphery stamper positioner 12 to form a step in the disc substrate 1.

Figure 4:
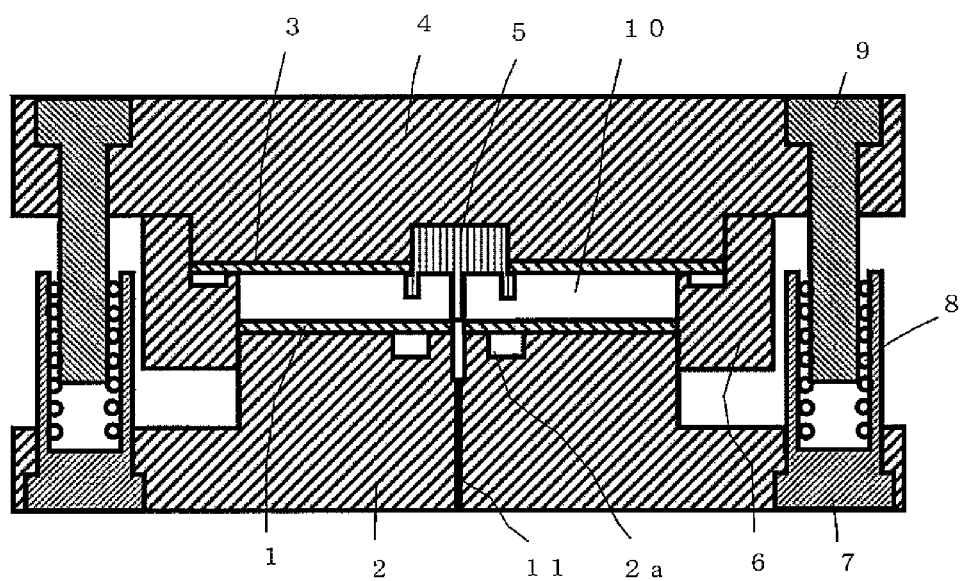
FIG. 4 A cross-sectional view showing a method for manufacturing an information recording medium according to an example embodiment.

When producing the optical disc 100 of FIG. 1(c), a mold shown in FIG. 4 is used. As compared with FIG. 2(a), the shape of the inner-periphery stamper holder 5 and that of the depression 2a provided at the center of the mirror plate 2 are different. As opposed to a single annular step in FIG. 2(a), a protrusion to be an annular rib is formed in FIG. 4. The optical disc 100 of FIG. 1(d) can be realized by a combination of FIG. 3 and FIG. 4.

Here, a cylindrical protrusion is provided at the center of the inner-periphery stamper holder 5 or the inner-periphery stamper positioner 12 and is designed so as to fit in the inner hole of the disc substrate 1, whereby positioning is done by the inner hole when transferring the disc substrate 1; however, the disc substrate 1 may be attached in the mold in a state where it has only been machined to the outer diameter with no inner hole, and the inner hole may be formed in the disc substrate 1 inside the mold by providing a cylindrical protrusion at the center of the inner-periphery stamper holder 5 and the inner-periphery stamper positioner 12 in the mold as a punch-through blade that fits the receiving side. In this case, positioning is done with the outer periphery of the disc substrate 1. When moving the disc substrate 1 into the mold from another place, it may be sucked in a place different from the data area, e.g., on the inner side of the data area. Where the inner hole has already been formed in the disc substrate 1, a claw-like member may be pushed through the inner hole and then spread out so as to hold and transfer the disc substrate 1.

A step formed in the disc substrate 1 is formed on a plane generally vertical with respect to the unchanged plane before the formation of the step, such as the data area. This angle is formed to be 80 deg or more.

(Embodiment 3)

Next, as a method for manufacturing an optical disc according to Embodiment 3 of the present invention, a manufacturing method for a case where depressions/protrusions, e.g., signals to be information and tracks, have already been formed in the data area of the disc substrate 1 will be described. It is assumed that the depressions/protrusions are formed on the upper surface of the disc substrate 1. When producing the optical disc 100 of FIG. 1(a), a mold shown in FIG. 5 is used.

Figure 5:
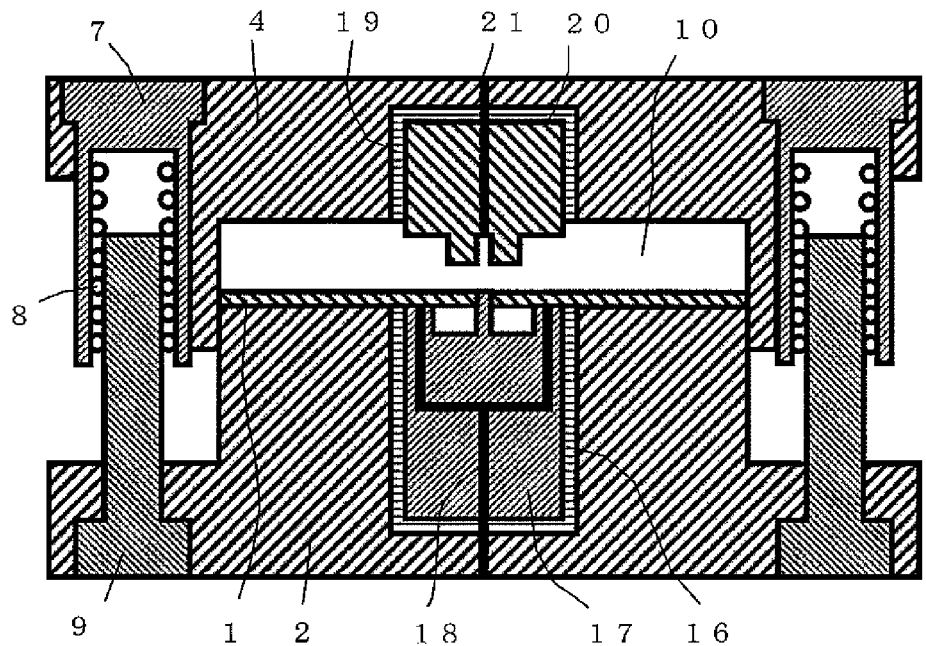
FIG. 5 A cross-sectional view showing a method for manufacturing an information recording medium according to an example embodiment.

In FIG. 5, the disc substrate 1 is in contact with the mirror plate 2. On the inner periphery side of the mirror plate 2, a cylindrical receiving bush 17 is provided via a heat insulating material 16. An annular groove is provided on the surface of the receiving bush 17 and is coupled to a suction passage 18, whereby the disc substrate 1 is sucked and secured by suction.

On the other hand, the mirror plate 4 is provided above the disc substrate 1, and a punch bush 20 is provided on the inner side of the mirror plate 4 via a heat insulating material 19. Here, it is so configured that the mirror plate 4 will not be in contact with the disc substrate 1. This is to avoid contacting and destroying the depressions/protrusions, which have been formed in the data area on the disc substrate 1. The punch bush 20 and the receiving bush 17 are axially aligned with each other, and can be fitted together. The punch bush 20 and the receiving bush 17 are both provided with a heating mechanism (not shown). The heating mechanism may be one that provides a flow of a medium from a temperature adjuster or may be one that heats with a heater.

A depressed portion is provided at the center of the punch bush 20, and fits with a protruding portion at the center of the receiving bush 17. A suction passage 21 is provided at the center of the punch bush 20, and it is for evacuating the air inside the cavity 10 to achieve a vacuum after the cavity 10 is formed by closing the upper mold and the lower mold.

The poles 9 are provided on the outer side of the mirror plate 2, and fit with the bushes 7 on the outer side of the mirror plate 4 via the ball bearings 8, thereby providing four guide posts. With the guide posts, the upper mold and the lower mold can be moved so that the mirror plate 4 and the mirror plate 2 move while being in parallel to each other.

When securing the disc substrate 1 to the receiving bush 17, the center position of the data area is determined by identifying the boundary between the data area on the disc substrate 1 and the mirror surface with a microscope, and the disc substrate 1 is held by evacuation on the upper surface thereof on the inner side of the data area; after the disc substrate 1 is moved to a position aligned with the center of the receiving bush 17 and a height such that it is in contact with the upper surface of the receiving bush 17, suction is performed through the suction passage 18 which communicates with the upper surface of the receiving bush 17.

A press was done at 500 kgf for 10 seconds with the temperature of the mirror plate 2 and the mirror plate 4 being 180° C., where the disc substrate 1 is a polycarbonate resin with a thickness of 0.1 mm, an inner diameter of 5 mm and an outer diameter of 120 mm, with the step having an outer diameter of 15 mm and a height of 2 mm, the data area having an inner diameter of 50 mm, and the punch bush 20 and the receiving bush 17 having an outer diameter or 40 mm.

The mold was made of a stainless steel, and the heat insulating material was polytetrafluoroethylene, which is a fluororesin.

Figure 2:
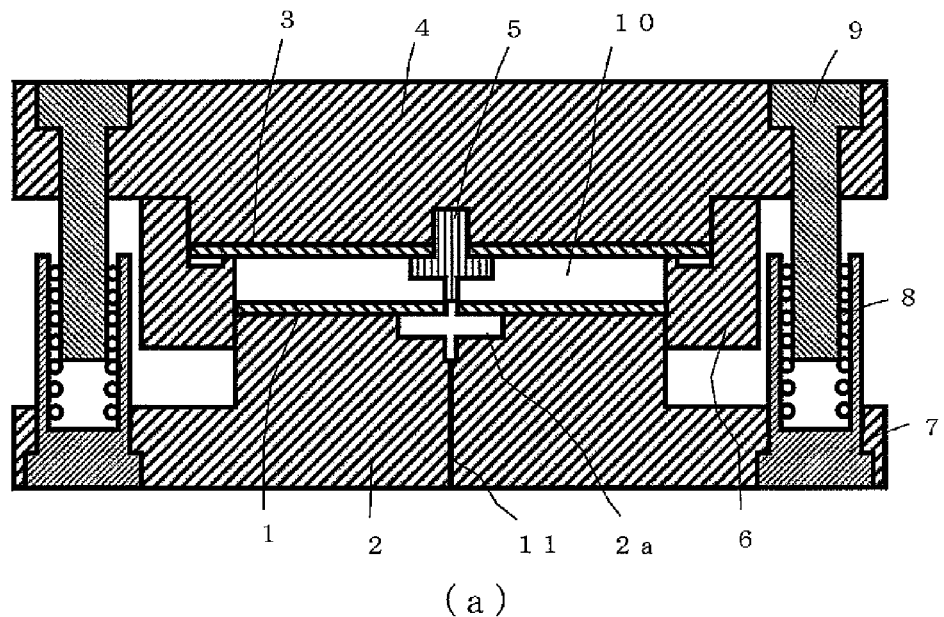
FIG. 2 (*a*) and (*b*) are cross-sectional views showing a method for manufacturing an information recording medium according to an example embodiment.
Figure 2:
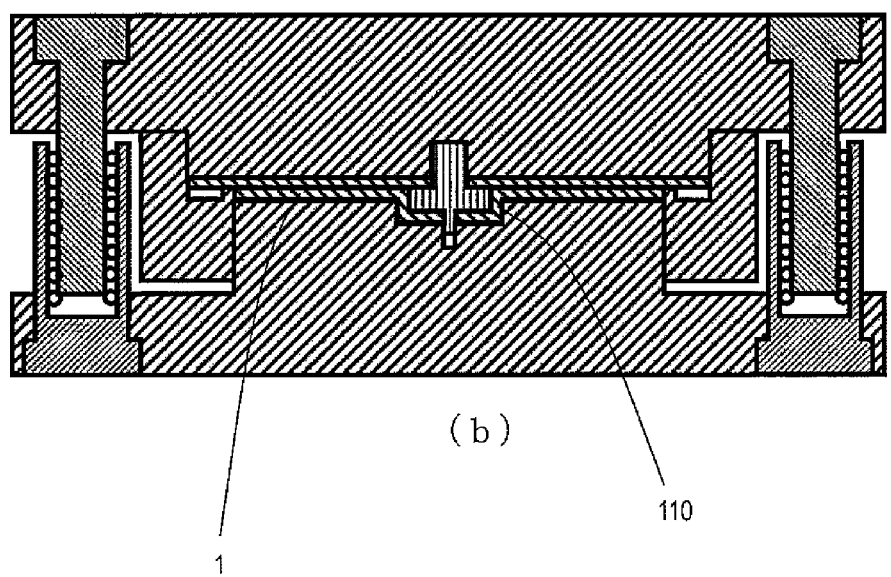

As compared with FIG. 2, FIG. 5 shows an opposite configuration of depressions/protrusions at the center between the upper mold and the lower mold. The configuration of the poles 9 and the bushes 7 of the guide posts on the outside is also opposite between the upper mold and the lower mold. Needless to say, the configuration may be that of FIG. 2.

Although only a mold corresponding to FIG. 1(a) is illustrated herein, molds corresponding to FIGS. 1(b) to 1(d) can also be produced as can be seen from a comparison between FIG. 2, FIG. 3, FIG. 4 and FIG. 5.

(Embodiment 4)

Figure 6:
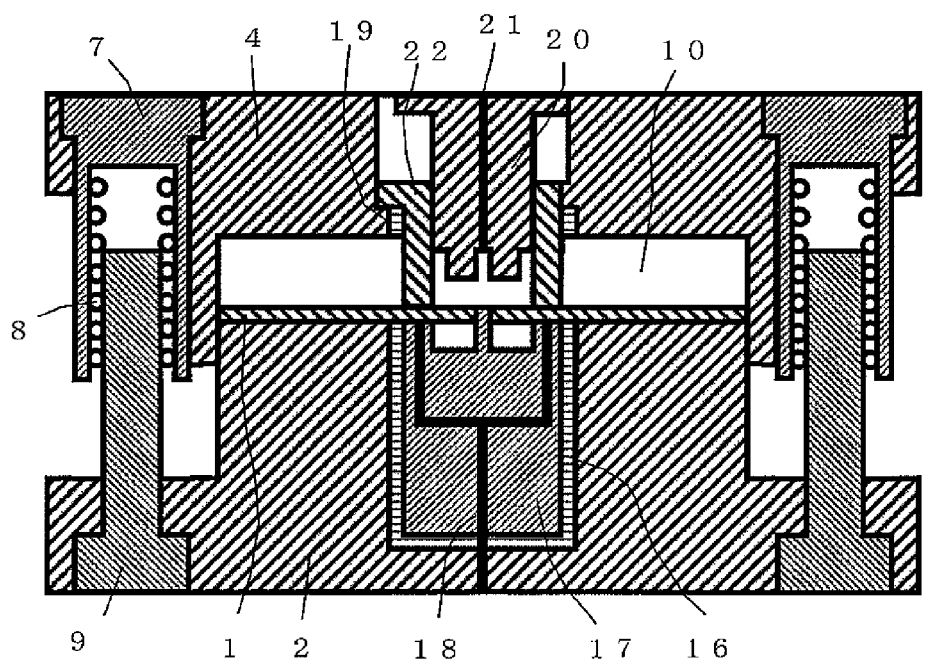
FIG. 6 A cross-sectional view showing a method for manufacturing an information recording medium according to an example embodiment.

Embodiment 3 of the method for manufacturing the optical disc 100 has illustrated a case where the punch bush in a central portion of the upper mold is fixed for producing the optical disc 100 of FIG. 1(a). A method for manufacturing the optical disc 100 according to Embodiment 0.4 is a method in which a step is formed after a portion of the disc substrate 1 that is on the inner side of the data area and is on the outer side of the step-forming portion is held by the upper mold member and the lower mold member as shown in FIG. 6. It is assumed that the depressions/protrusions are formed on the upper surface of the disc substrate 1. When producing the optical disc 100 of FIG. 1(a), a mold shown in FIG. 6 is used.

In FIG. 6, the punch bush 20 is movable. A thrust bush 22 is provided between the mirror plate 4 and the punch bush 20, and it thrusts out after the mold is closed to sandwich the disc substrate 1 between the thrust bush 22 and the receiving bush 17. In FIG. 6, the right half and the left half show cross sections that are rotated by 90 deg with respect to each other. That is, the thrust bush 22 does not have a uniform cross section across the circumference, but has a slit-like cross section. As a result, the thrust bush 22 moves in the axial direction inside the mirror plate 4 with no play.

The punch bush 20 and the thrust bush 22 are configured to thrust out toward the cavity 10 of the mold by means of a thrust mechanism (not shown) using an air pressure or an oil pressure, and is retracted in the upper mold by means of a spring when no thrusting force is acting.

(Embodiment 5)

Next, a holder 200 for the optical disc 100 according to Embodiment 5 of the present invention will be described using FIGS. 7(a) and 7(b). The shape of the optical disc 100 is that of FIG. 1(b).

Figure 7:
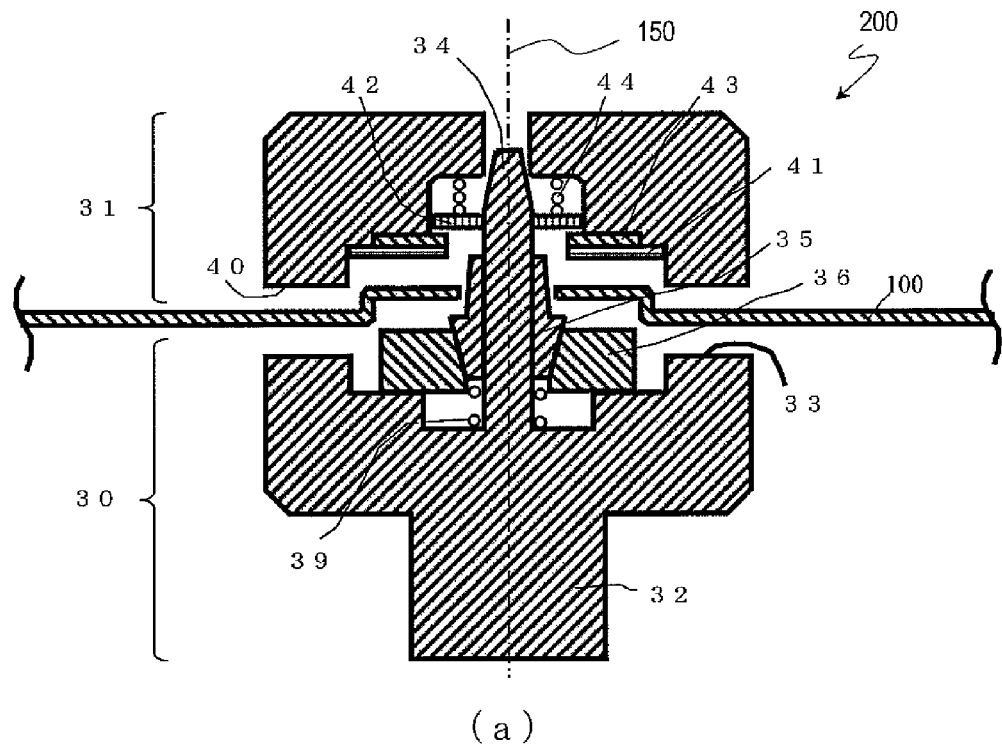
FIG. 7 (*a*) and (*b*) are cross-sectional views showing a holder for an information recording medium according to an example embodiment.
Figure 7:
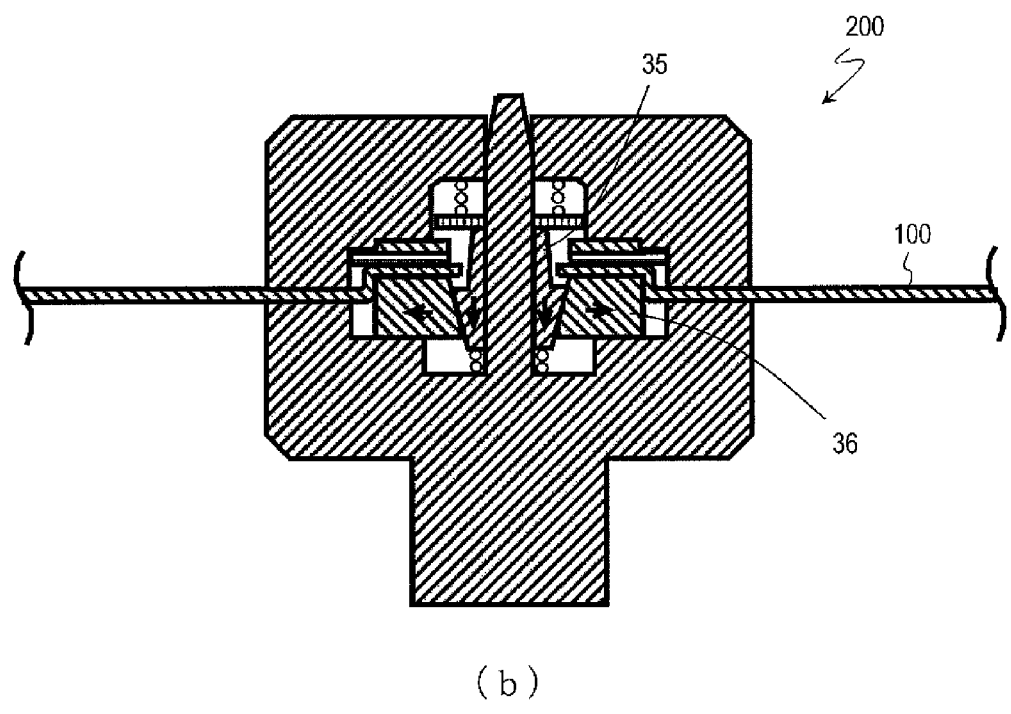

FIG. 7(a) is a diagram showing groups of members, divided into the optical disc 100, a supporting portion 30, and a holding portion 31.

Figure 8:
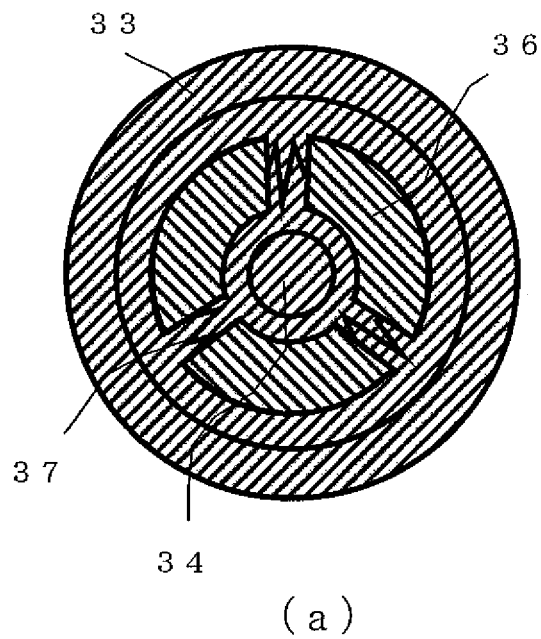
FIG. 8 (*a*) and (*b*) are partial plan views of a supporting portion of a holder for an information recording medium according to an example embodiment.
Figure 8:
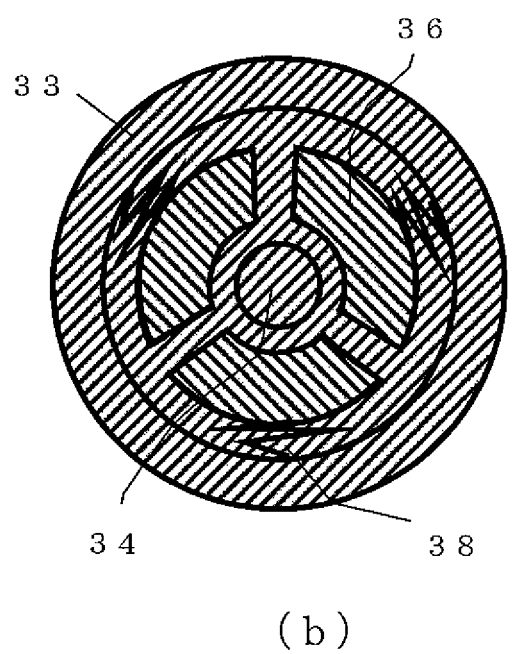

The supporting portion 30 includes a spinning spindle 32, a clamp portion 33 and a center pole 34 provided as an integral member. There are an annular member 35 that is concentric with and fits with the center pole 34, and an annular divided member 36 that is in contact with the annular member 35 and is divided into pieces. FIGS. 8(a) and 8(b) show the supporting portion 30 as seen from above, with the annular member 35 removed. FIGS. 8(a) and 8(b) both show a case where the annular divided member 36 is divided into three pieces across the circumference. In FIG. 8(a), the annular divided members 36 are connected together with springs 37, and are adjusted so as to shrink toward the annular member 35. In FIG. 8(b), springs 38 are arranged on the wall surface of the clamp portion 33 so as to push the annular divided members 36 toward the annular member 35. Needless to say, a combination of these may be used. The inner hole of the optical disc 100 has a larger diameter than the outer diameter of the annular member 35 in the fitting portion of the annular member 35.

A spring 39 is provided between the annular member 35 and the clamp portion 33, pushing up the annular member 35 along the direction of an axis of rotation 150. The annular member 35 and the annular divided member 36 are concentric, with the contacting surfaces tapered with the same inclination, and as the annular member 35 moves up and down in the axial direction, the annular divided members 36 accordingly narrow or widen in the radial direction. The annular member 35 is pushed down to spread the annular divided members 36, whereby the outer-periphery surface of the annular divided members contact the side surface of the step of the optical disc 100, thus positioning so that the center of the optical disc 100 and the center of the supporting portion 30 are aligned with each other.

The holding portion 31 is configured so as to fit with the center pole 34 of the supporting portion 30, and includes a clamp portion 40, a cushion portion 41 to be in contact with the area on the inner side of the clamp portion 40, a pushing plate 42 for pushing the annular member 35 of the supporting portion 30, and a stop plate 43 for holding the pushing plate 42 so that the pushing plate 42 will not come off the holding portion 31. The pushing plate 42 is pushed toward the supporting portion 30 by a spring 44.

As shown in FIG. 7(b), if a holding portion 31 is placed after the optical disc 100 is placed on the supporting portion 30, the spring 44 on a holding plate 42 shrinks to push the annular member 35 in the downward direction, spreading the annular divided members 36 so that the outer peripheries of the annular divided members 36 contact the side surface of the step of the optical disc 100.

The optical disc 100 has an inner hole, and the structure is such that the center pole 34 of a receiving portion 30 is passed through the inner hole, and therefore it can be said that the optical disc 100 will not fly while the optical disc 100 is spinning.

It is necessary that the annular divided members 36 will not slip but stop reliably at the step of the optical disc 100. In view of this, the step needs to have a height of 1 mm or more and an angle of 80 deg or more. The more the height of the step is, the more likely it will stop, but the thickness will be so small that it will no longer possible to maintain a sufficient strength. In view of this, the height of the step is preferably 3 mm or less, and desirably 2 mm or less.

(Embodiment 6)

Embodiment 5 of the holder for the optical disc 100 has illustrated a case where positioning is done from inside of the step of the optical disc 100. In Embodiment 6 directed to a method for holding the optical disc 100, a case where positioning is done from outside of the step of the optical disc 100 will be described using FIGS. 9(a) and 9(b). The shape of the optical disc 100 is that of FIG. 1(a).

Figure 9:
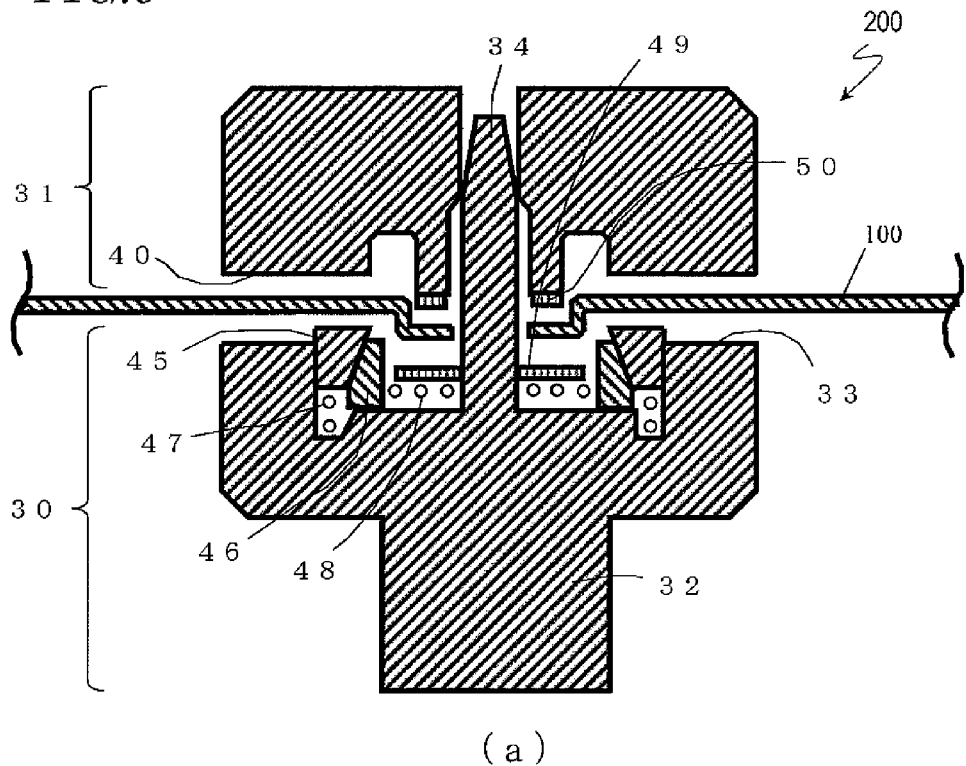
FIG. 9 (*a*) and (*b*) are cross-sectional views showing a holder for an information recording medium according to an example embodiment.
Figure 9:
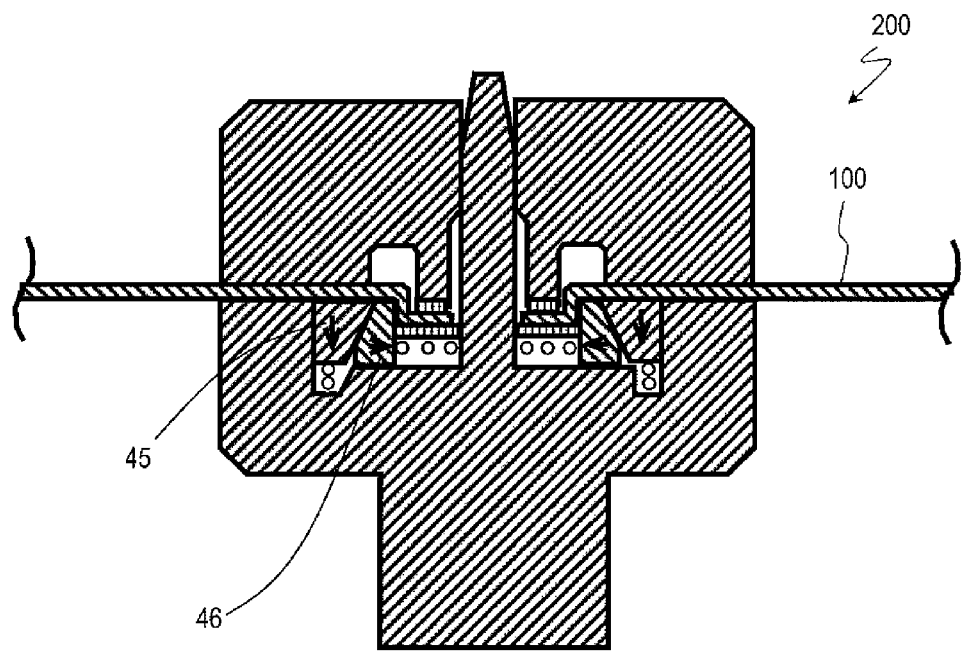

FIG. 9(a) is a diagram showing groups of members, divided into the optical disc 100, the supporting portion 30, and the holding portion 31.

The supporting portion 30 includes the spinning spindle 32, the clamp portion 33 and the center pole 34 provided as an integral member. There are an annular member 45 that is concentric with the center pole 34 and fits with the clamp portion 33, and an annular divided member 46 that is in contact with the annular member 45 and is divided into pieces. The annular member 45 is pushed up by a spring 47 in the axial direction of the center pole 34. The annular divided members 46 are pushed by springs 48 toward the outside in the radial direction. The annular member 45 and the annular divided member 46 have tapered surfaces of the same inclination and are in contact with each other. The spring 48 is covered by a spring cover 49.

Figure 10:
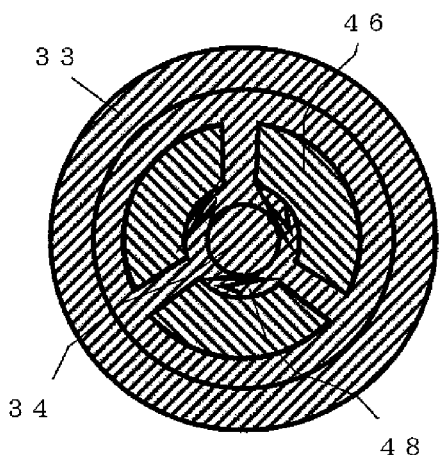
FIG. 10 A partial plan view for a supporting portion of a holder for an information recording medium according to an example embodiment.

FIG. 10 shows the supporting portion 30 as seen from above, with the annular member 45, the spring 47 and the spring cover 49 removed. FIG. 10 shows a case where the annular divided member 46 is divided into three pieces across the circumference.

The holding portion 31 is configured to fit with the center pole 34 of the supporting portion 30, and is composed of the clamp portion 40 of the optical disc 100, an inner periphery supporting portion 50 for holding the flat portion on the inner side of the step of the optical disc 100, and a cushion 51.

As shown in FIG. 9(b), if the holding portion 31 is placed after the optical disc 100 is placed on the supporting portion 30, the annular member 45 moves down in the downward direction, pushing the annular divided members 46 inward, and the inner peripheries of the annular divided members 46 contact the step of the optical disc 100.

Concentric members, i.e., the clamp portion 33, the annular member 45 and the annular divided member 46, are in surface contact with one another, and a step is formed concentric with the center of the data area on the optical disc 100, thus achieving the positioning such that the center of the spinning supporting portion 30 is aligned with the center of the optical disc 100.

The optical disc 100 has an inner hole, and the structure is such that the center pole 34 of a receiving portion 30 is passed through the inner hole, and therefore it can be said that the optical disc 100 will not fly while the optical disc 100 is spinning.

It is necessary that the annular divided members 46 will not slip but stop reliably at the step of the optical disc 100. In view of this, the step needs to have a height of 1 mm or more and an angle of 80 deg or more. The more the height of the step is, the more likely it will stop, but the thickness will be so small that it will no longer possible to maintain a sufficient strength. In view of this, the height of the step is preferably 3 mm or less, and desirably 2 mm or less.

(Embodiment 7)

FIGS. 11(a) to 11(f) are cross-sectional views of the optical disc 100 according to Embodiment 7 of the present invention.

In the inner periphery area 101 of the optical disc 100 (in the clamp area or on the inner side of the clamp area), an annular step 110 that is concentric with the center of the data area 102 is formed.

Figure 11:
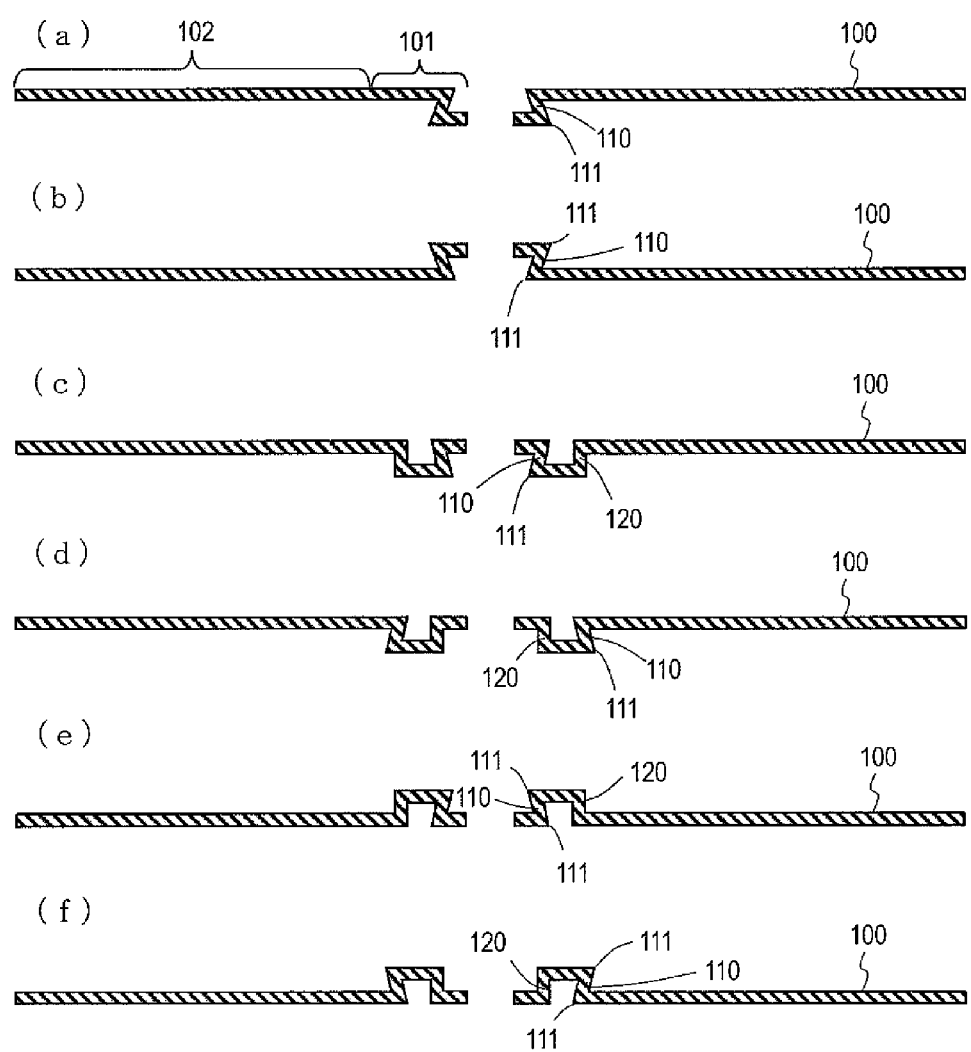
FIG. 11 (a), (b), (c), (d), (e) and (f) are cross-sectional views of an information recording medium according to an example embodiment.

Comparing FIG. 11 with FIG. 1, one annular step 110 is formed with an acute angle with respect to the inner side in FIG. 11. The angle of the step 110 formed with an acute angle is, for example, 50 degrees to 80 degrees with respect to the disc surface. A tapered portion 52a (FIG. 12) of the annular member, which engages with the step 110 of the optical disc 100, has an angle of 40 degrees to 70 degrees, for example, with respect to the disc surface.

Figure 23:
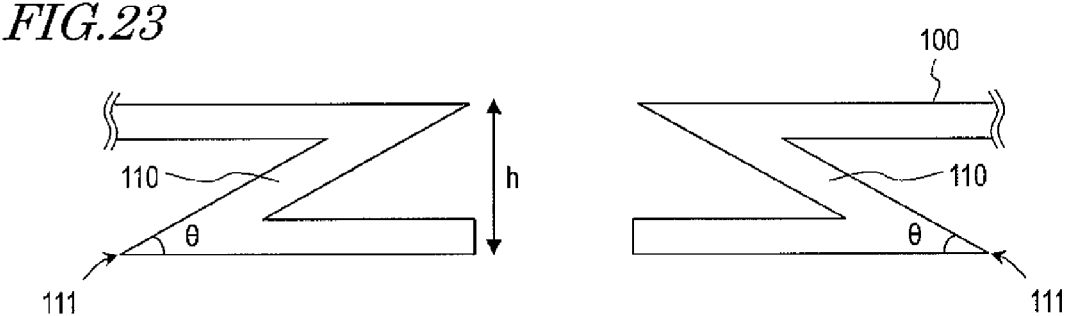
FIG. 23 A partial cross-sectional view showing a step of an information recording medium according to an example embodiment.

FIG. 23 is a cross-sectional view showing the details of the shape of the step 110. The step 110 has an acute-angle edge portion 111 used for positioning the center of the optical disc. The angle θ of the inner side of the cross section of the acute-angle edge portion 111 is, for example, 50 degrees or more and 80 degrees or less.

If the step 110 is formed in this shape, the optical disc 100 can be held only with a single annular member, thus simplifying the apparatus configuration. FIG. 12 to FIG. 17 show examples of holders for the optical disc 100 of the present invention.

Figure 12:
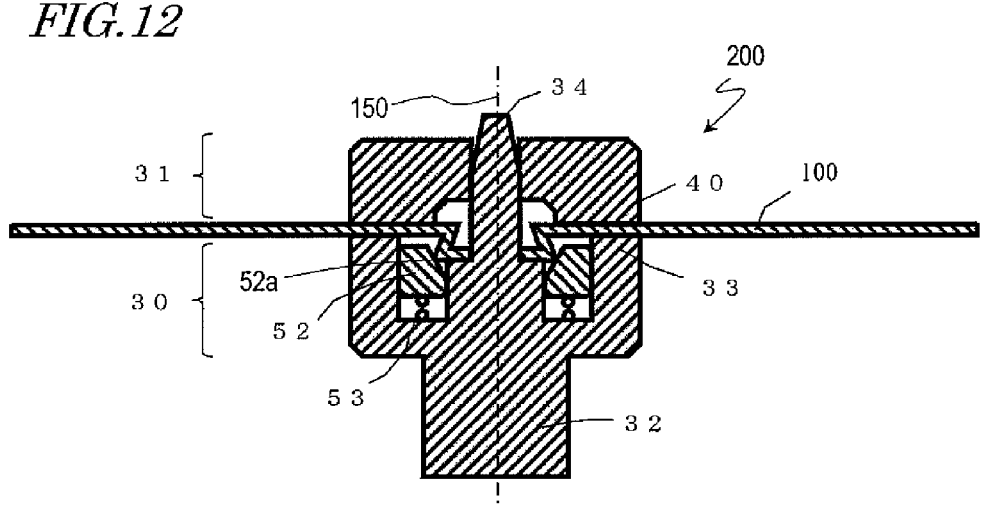
FIG. 12 A cross-sectional view showing a holder for an information recording medium according to an example embodiment.
Figure 13:
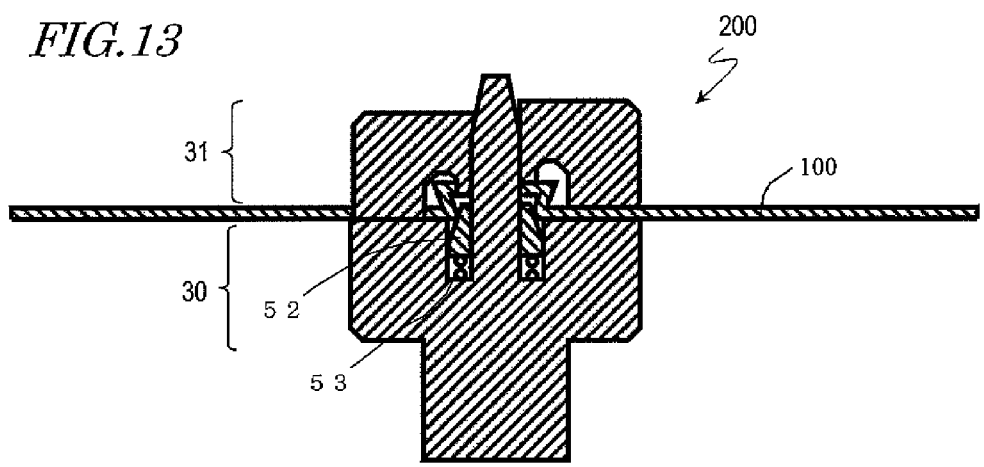
FIG. 13 A cross-sectional view showing a holder for an information recording medium according to an example embodiment.
Figure 14:
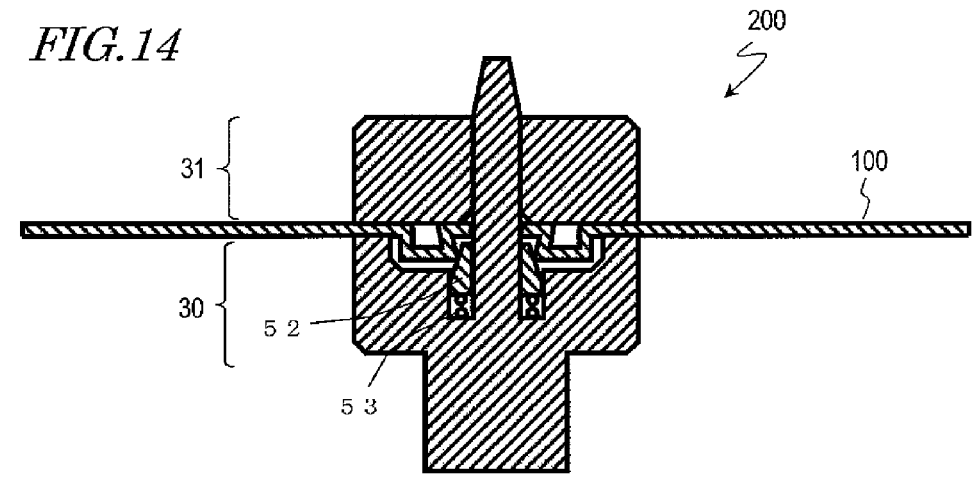
FIG. 14 A cross-sectional view showing a holder for an information recording medium according to an example embodiment.
Figure 15:
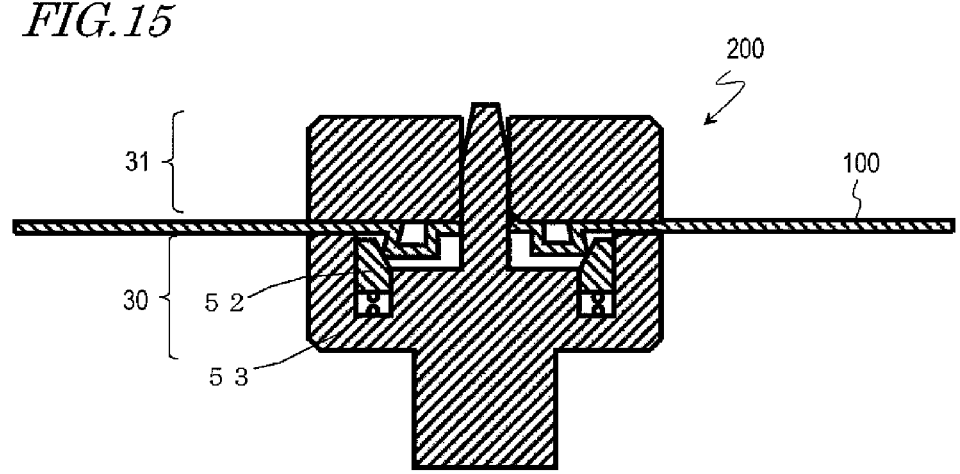
FIG. 15 A cross-sectional view showing a holder for an information recording medium according to an example embodiment.
Figure 16:
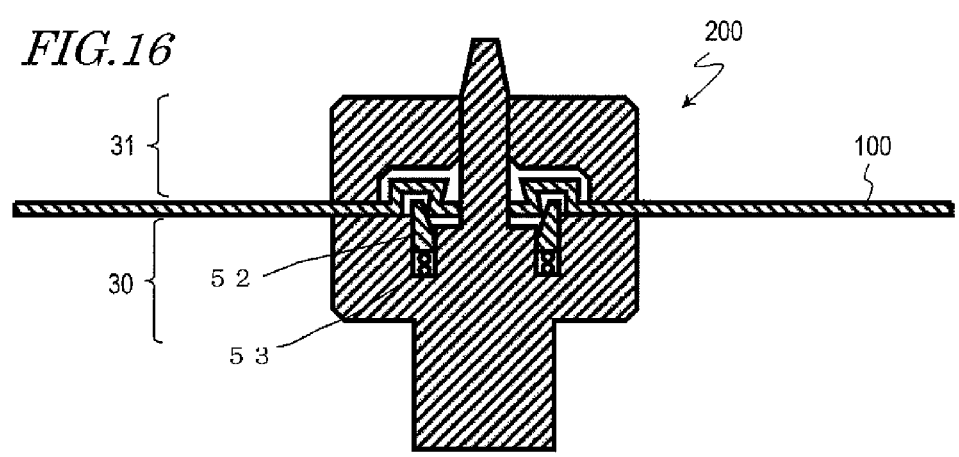
FIG. 16 A cross-sectional view showing a holder for an information recording medium according to an example embodiment.
Figure 17:
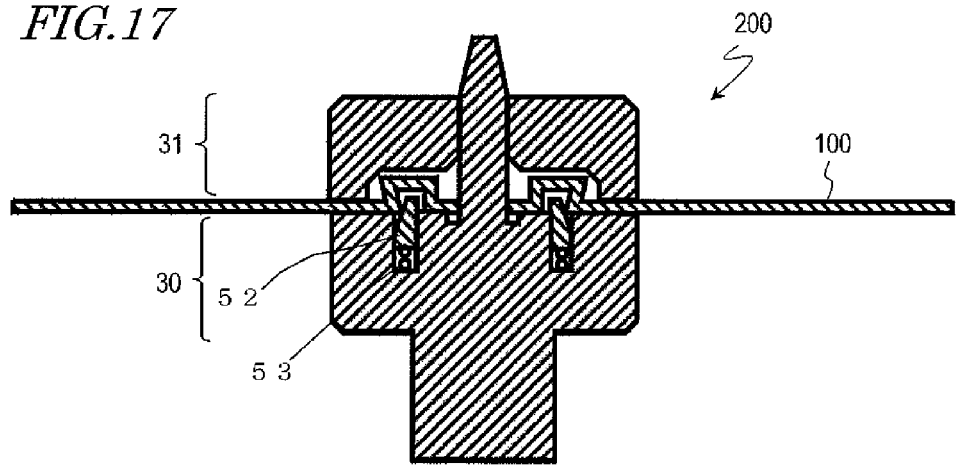
FIG. 17 A cross-sectional view showing a holder for an information recording medium according to an example embodiment.

FIG. 12 shows a holding portion for a case where the optical disc 100 is that of FIG. 11(a), FIG. 13 shows a holding portion for a case where the optical disc 100 is that of FIG. 11(b), FIG. 14 shows a holding portion for a case where the optical disc 100 is that of FIG. 11(c), FIG. 15 shows a holding portion for a case where the optical disc 100 is that of FIG. 11(d), FIG. 16 shows a holding portion for a case where the optical disc 100 is that of FIG. 11(e), and FIG. 17 shows a holding portion for a case where the optical disc 100 is that of FIG. 11(f).

In FIG. 12, in the supporting portion 30, the spindle 32, the clamp portion 33 and the center pole 34 spin as an integral member about the axis of rotation 150. The structure is such that a concentric annular member (positioning section) 52 is fitted between the clamp portion 33 and the center pole 34 of the supporting portion 30, and the annular member 52 is pushed up in the axis-of-rotation direction by a spring 53. The outer diameter of the center pole 34 is larger than the inner hole of the optical disc 100.

The holding portion 31 includes an aperture that fits with the center pole 34, and the clamp portion 40. The annular member 52 has the tapered portion 52a that is inclined with respect to the axis-of-rotation direction. When the holding portion 31 is fitted after the optical disc 100 is placed on the supporting portion 30, the acute-angle edge portion 111 of the step provided on the optical disc 100 is pressed against the tapered surface 52a of the annular member 52, pushing down the annular member 52.

As a result, positioning is done so that the center of the data area 102 of the optical disc 100 is aligned with the center of rotation of the supporting portion 30.

In FIG. 13, the structure is such that the tapered surface 52a of the annular member 52 is facing outside and contacts the acute-angle edge portion 111 facing toward the inside of the optical disc 100.

In FIG. 14 and FIG. 15, as compared with FIG. 12 and FIG. 13, the difference is whether the step of the optical disc 100 is a single step or in a groove shape, and the basic structure of the supporting portion 30 is the same between FIG. 14 and FIG. 13, and between FIG. 15 and FIG. 12.

While the step 110 of the optical disc 100 is formed to be protruding toward the signal surface side in FIG. 16 and FIG. 17, the basic structure of the supporting portion 30 is the same between FIG. 16 and FIG. 15, and between FIG. 17 and FIG. 14.

The angle of the step of the optical disc 100 is, for example, from 50 degrees to 80 degrees with respect to the disc surface, and the tapered portion of the annular member, which engages with the step portion of the optical disc 100, is, for example, from 40 degrees to 70 degrees with respect to the disc surface. With such angles, the edge of the step of the optical disc 100 and the tapered portion of the annular member firmly engage with each other, transferring force therebetween, thus achieving the positioning such that the center of the data area 102 of the optical disc 100 is aligned with the center of rotation of the supporting portion 30.

Embodiment 8

Figure 18:
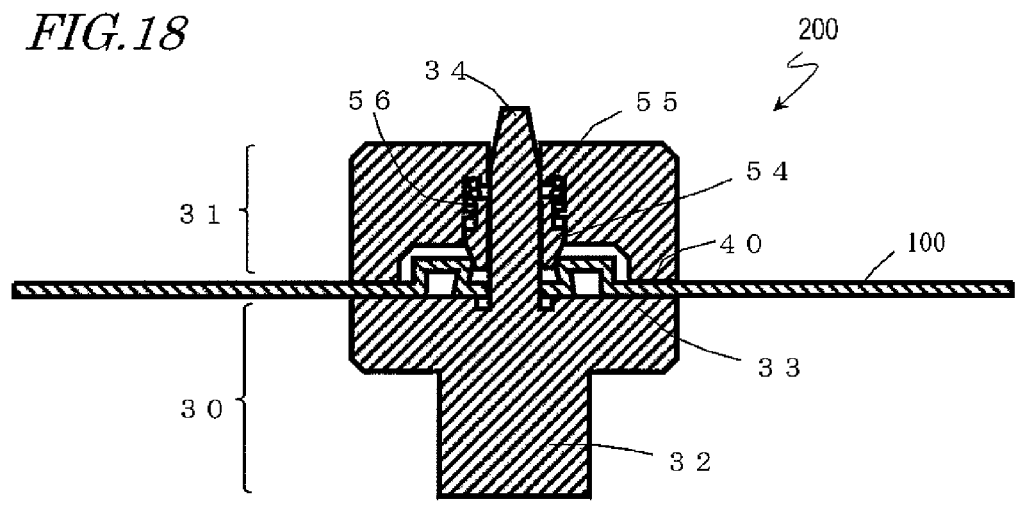
FIG. 18 A cross-sectional view showing a holder for an information recording medium according to an example embodiment.
Figure 19:
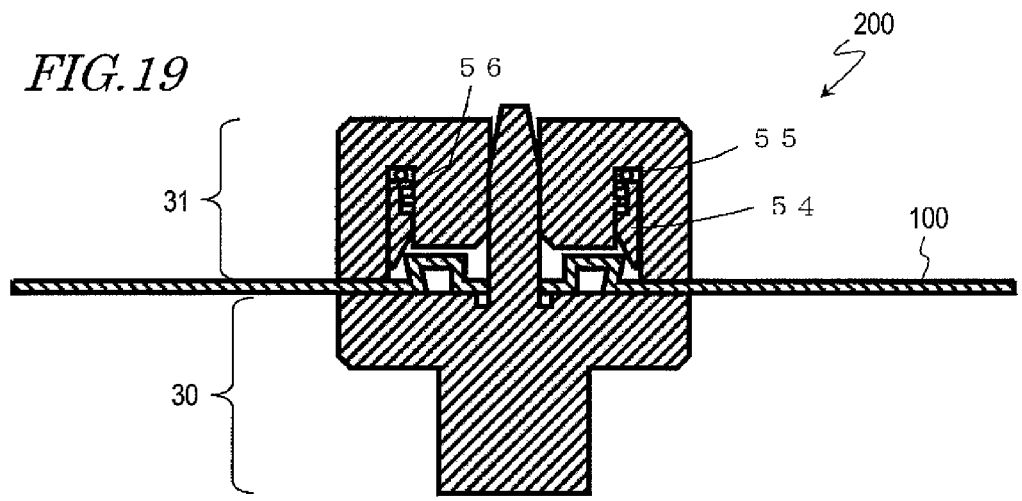
FIG. 19 A cross-sectional view showing a holder for an information recording medium according to an example embodiment.

FIG. 18 and FIG. 19 show the holder 200 of the optical disc 100 according to Embodiment 8 of the present invention. FIG. 18 shows a holder for the optical disc 100 of FIG. 11(e), and FIG. 19 shows a holder for the optical disc 100 of FIG. 11(f). In these cases, the positioning mechanism is formed on the side of the holding portion 31. The basic structure for the positioning is the same between FIG. 18 and FIG. 14, and between FIG. 19 and FIG. 15.

A stopper 56 is provided so as to prevent an annular member 54 of the holding portion 31 from flying out.

Embodiment 9

In the optical disc 100 according to Embodiment 7, the step 110 has the acute-angle edge portion 111, and the holder 200 according to Embodiments 8 and 9 holds the optical disc 100 having the acute-angle edge portion 111. Now, a method for manufacturing an optical disc having an acute-angle edge portion according to Embodiment 9 of the present invention will be described.

Figure 20:
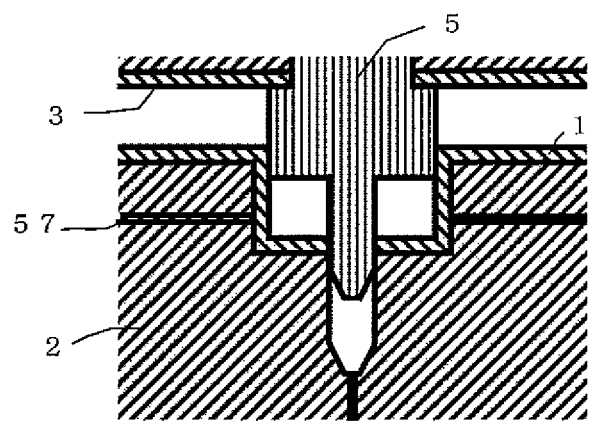
FIG. 20 (a) and (b) are partial cross-sectional views showing a method for manufacturing an information recording medium according to an example embodiment.
Figure 20:
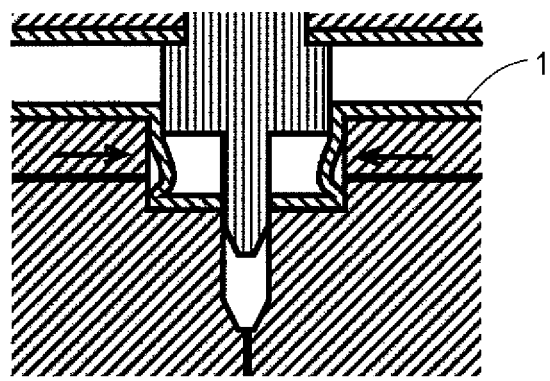

FIGS. 20(a) and 20(b) show a method for manufacturing the optical disc 100 in a case where the optical disc 100 is that of FIG. 11(a).

FIG. 20(a) is a diagram showing only the inner periphery portion in a state where the mold is opened after the disc substrate 1 is formed in the shape of FIG. 1(a) according to the manufacturing method shown in FIG. 2. In the present embodiment, an air blow-out port 57 is provided on the side surface of the depressed portion 2a of the mirror plate 2 across the circumference. FIG. 20(b) shows a state where the air blow-out port 57 blows out the air, before the disc substrate 1 is cooled and cured, to deform the side surface of the disc substrate 1. As a result, the edge of the step on the side of the mirror plate 2 of the disc substrate 1 has an acute angle.

Figure 21:
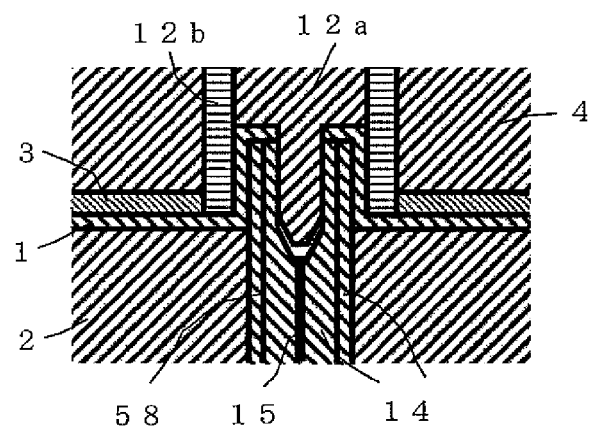
FIG. 21 (a), (b) and (c) are partial cross-sectional views showing a method for manufacturing an information recording medium according to an example embodiment.
Figure 21:
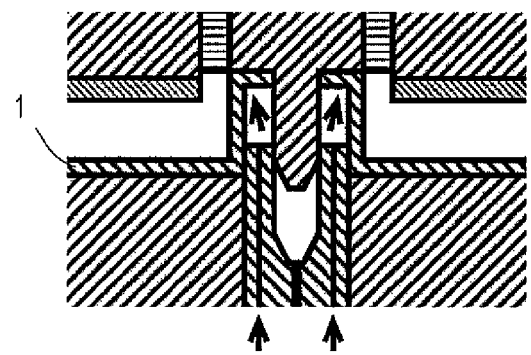
Figure 21:
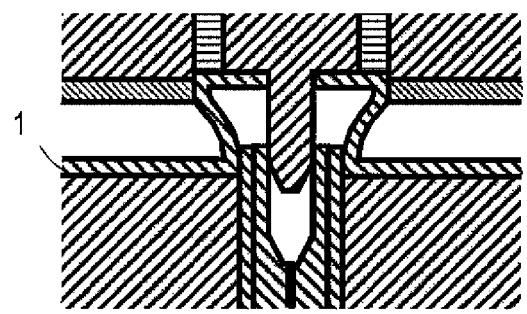

FIGS. 21(a), 21(b) and 21(c) show a method for manufacturing the optical disc 100 where the optical disc 100 is that of FIG. 11(b). The basic structure of the mold is the same as that of FIG. 3. In FIGS. 20(a) and 20(b), as compared with FIG. 3, the inner-periphery positioner 12 is composed of an inner portion 12a fixed to the mirror plate 4, and a movable portion 12b. An air blow-out port 58 is provided at the tip of the punch 14.

FIG. 21(a) shows a state where the mold is closed, and when the mold is opened, the movable portion 12b of the inner-periphery positioner 12 lowers, and the punch 14 retracts to the place illustrated, as shown in FIG. 21(b), with the air blowing out from the tip of the punch 14 through the air blow-out port 58. As a result, the disc substrate 1 before being cured is deformed as shown in FIG. 21(c), whereby the step of the disc substrate 1 has an acute angle.

As described above, the air is blown out before the disc substrate 1 is cured, whereby the step of the disc substrate 1 can be made in an acute angle. Thus, also with groove-shaped steps of FIGS. 11(c) to 11(f), it is possible to form a step whose angle is acute.

Industrial Applicability

The optical disc and the holder for the optical disc according to one aspect of the present invention is particularly useful in a field where data is recorded and reproduced.

Reference Signs List

1 Disc substrate
2, 4 Mirror plate
2a Depressed portion
3 Stamper
5 Inner-periphery stamper holder
6 Outer-periphery stamper holder
7 Bush
8 Ball bearing
9 Pole
10 Cavity
11, 15, 18, 21 Suction passage
12, 12a, 12b Punch bush
13 Suction groove
14 Punch
16, 19 Heat insulating material
17 Receiving bush
20 Punch bush
22 Thrust bush
30 Supporting portion
31 Holding portion
32 Spindle
33, 40 Clamp portion
34 Center pole
35, 45, 52, 54 Annular member
36, 46 Annular divided member
37, 38, 39, 44, 47, 48, 53, 55 Spring
41, 51 Cushion
42 Pushing plate
43 Stop plate
49 Spring cover
50 Inner periphery supporting portion
56 Stopper
57, 58 Air blow-out port
100 Optical disc
101 Inner periphery area
102 Data area
110, 120 Step
110a, 110b Side surface of step
111 Acute-angle edge portion
150 Axis of rotation
200 Holder
221 Recording layer
222 Reflection layer
223 Protection layer

The invention claimed is:

1. An information recording medium, comprising a disc substrate formed by a resin, whose thickness in a data area thereof is 0.2 mm or less, further comprising:
   a step in an inner periphery area of the information recording medium, the step having a height of 1 mm or more and 3 mm or less, wherein:
   the step includes an acute-angle edge portion used for positioning a center of the information recording medium when spinning the information recording medium; and
   an angle with respect to a plane of the data area of an external surface of the acute-angle edge portion is 50 degrees or more and 80 degrees or less.

2. The information recording medium of claim 1, wherein:
   the information recording medium includes a plurality of steps; and
   at least one of the plurality of steps includes the acute-angle edge portion.

3. The information recording medium of claim 1, wherein the acute-angle edge portion includes a first segment parallel to the plane of the data area, a second segment parallel to the plane of the data area and spaced apart from the first segment, and a slope segment that extends from the second segment to the first segment at the angle of 50 degrees or more and 80 degrees or less.

4. A holder for holding an information recording medium, the information recording medium comprising: a disc substrate formed by a resin whose thickness in a data area thereof is 0.2 mm or less, a step in an inner periphery area of the information recording medium, the step having a height of 1 mm or more and 3 mm or less, wherein the step includes an acute-angle edge portion used for positioning a center of the information recording medium when spinning the information recording medium, and an angle with respect to a plane of the data area of an external surface of the acute-angle edge portion is 50 degrees or more and 80 degrees or less;
   the holder comprising:
   a holding portion for holding the information recording medium; and
   a positioning section for positioning a center of the information recording medium,
   wherein the positioning section positions the center of the information recording medium by contacting the acute-angle edge portion of the step.

5. The holder of claim 4, wherein:
   the positioning section is movable along an axis-of-rotation direction of the information recording medium;
   the positioning section includes a tapered portion inclined with respect to the axis-of-rotation direction; and
   positioning of the center of the information recording medium is done by pressing the acute-angle edge portion of the step and the tapered portion against each other.

6. An information recording medium, comprising a disc substrate formed by a resin, whose thickness in a data area thereof is 0.2 mm or less, further comprising:
   a step in an inner periphery area of the information recording medium, the step having a height of 1 mm or more and 3 mm or less, wherein:
   the step includes a side surface and an abutting member perpendicular to the side surface that are used for positioning a center of the information recording medium when spinning the information recording medium; and
   an angle between a plane direction of the data area and a side surface direction of an external surface of the step is 80 degrees or more and 100 degrees or less.

* * * * *